US007065062B2

(12) United States Patent
Madour et al.

(10) Patent No.: US 7,065,062 B2
(45) Date of Patent: Jun. 20, 2006

(54) MOBILE IP MOBILITY MANAGEMENT AT DORMANT HAND-OVER IN CDMA IP-BASED CELLULAR PACKET-DATA NETWORK

(75) Inventors: Lila Madour, Kirkland (CA); Mahmood Hossain, Montreal (CA)

(73) Assignee: Telefonaktiebolaget LM Ericsson (PUBL), Stockholm (SE)

( * ) Notice: Subject to any disclaimer, the term of this patent is extended or adjusted under 35 U.S.C. 154(b) by 1032 days.

(21) Appl. No.: 09/783,968

(22) Filed: Feb. 16, 2001

(65) Prior Publication Data

US 2002/0114293 A1 Aug. 22, 2002

(51) Int. Cl.
*H04Q 7/00* (2006.01)

(52) U.S. Cl. .................. 370/331; 370/329; 370/332; 370/335; 370/450; 455/435.1; 455/436; 455/437; 455/442

(58) Field of Classification Search ............... 370/331, 370/329, 342, 338, 332, 335, 450; 455/436, 455/439, 450, 509, 435.1, 437, 442
See application file for complete search history.

(56) References Cited

U.S. PATENT DOCUMENTS

| | | | | |
|---|---|---|---|---|
| 6,061,563 A * | 5/2000 | Lee | ............... | 455/435.1 |
| 6,219,547 B1 * | 4/2001 | Qaddoura et al. | ....... | 455/432.1 |
| 6,230,005 B1 * | 5/2001 | Le et al. | ............... | 455/414.1 |
| 6,487,406 B1 * | 11/2002 | Chang et al. | ............. | 455/422.1 |
| 6,580,699 B1 * | 6/2003 | Manning et al. | ............. | 370/331 |
| 6,708,031 B1 * | 3/2004 | Purnadi et al. | ............. | 455/436 |
| 2002/0055364 A1 * | 5/2002 | Wang et al. | | |
| 2002/0068570 A1 * | 6/2002 | Abrol et al. | | |

\* cited by examiner

*Primary Examiner*—Wellington Chin
*Assistant Examiner*—Kevin Mew
(74) *Attorney, Agent, or Firm*—Alex Nicolaescu; Ericsson Canada Inc.

(57) ABSTRACT

In an IP-based Code Division Multiple Access (CDMA) 2000 packet-data cellular telecommunications network, a method and system for handing over a dormant Mobile Node (MN) to a target packet zone. According to the invention, first the dormant MN sends an origination request message to the target Base Station Controller and Packet Control Function (BSC/PCF), which further sends a registration request comprising an indication that the MN is dormant to a Packet Data Service Node (PDSN). The PDSN replies to the BSC/PCF with a registration reply message for requesting the establishment of a traffic channel for the MN, and for indicating that it has data packets ready to be sent to the MN, such as for example Link Control Protocol (LCP) data packets for use in the negotiation of a new Point-to-Point Protocol (PPP) connection. The registration reply message comprises an indication such as for example a Data ready to Sent (DRS) parameter set to 1. The BSC/PCF establishes the traffic channel and forwards the data packets to the MN. Following the receipt of the registration reply in the BSC/PCF, the paging of the MN is avoided.

19 Claims, 3 Drawing Sheets

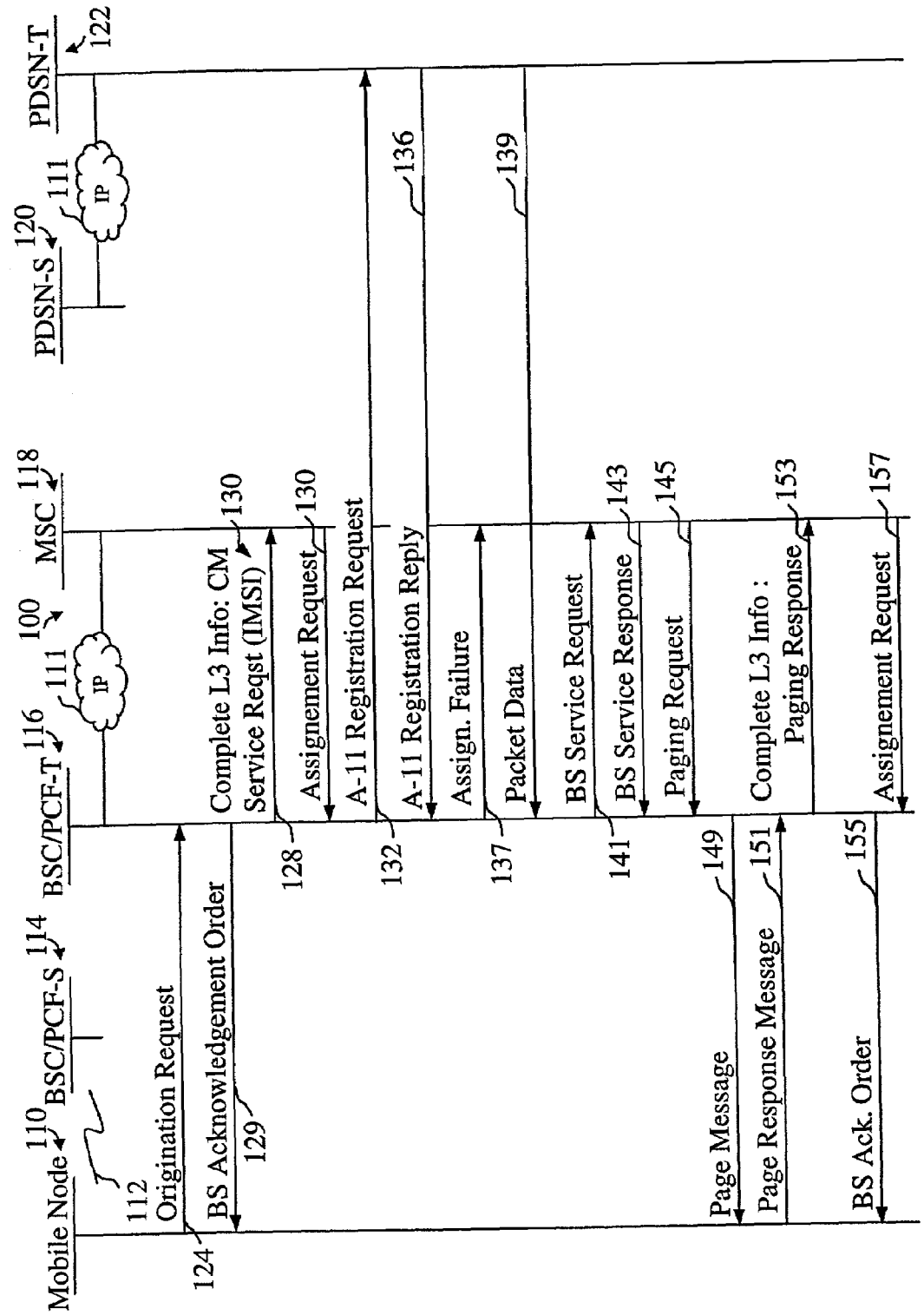
Figure 1.a (Prior Art)

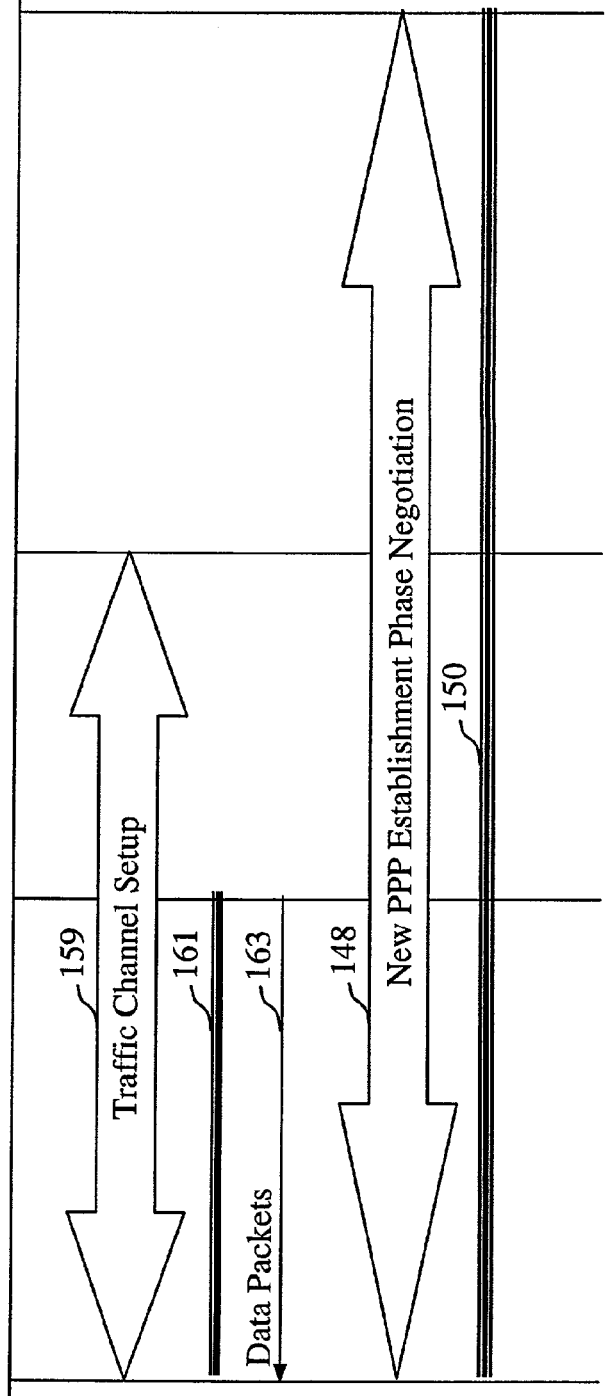
Figure 1.b (Prior Art)

MOBILE IP MOBILITY MANAGEMENT AT DORMANT HAND-OVER IN CDMA IP-BASED CELLULAR PACKET-DATA NETWORK

BACKGROUND OF THE INVENTION

1. Field of the Invention

The present invention relates to IP-based packet-data cellular telecommunications, particularly to a method and system for more efficiently managing a mobile node dormant hand-off in a CDMA packet-data cellular telecommunications network.

2. Description of the Related Art

The CDMA 2000 cellular telecommunications network is a third generation (3G) IP-based cellular telecommunications network that uses the Code Division Multiple Access (CDMA) radio access technology for providing high-speed wireless service to mobile stations (MS). The services include interactive and background type of traffic classes, as well as conversational and streaming type of services, such as voice, text, internet and multimedia applications.

An exemplary IP-based CDMA 2000 cellular telecommunications network includes a plurality of mobile stations herein designated as Mobile Nodes (MNs) communicating over a radio interface with Base Transceiver Stations (BTS). Each group of one or more BTSs is connected to, and controlled by a Base Station Controller (BSC) having a Packet Control Function (PCF), which purpose is to manage the radio resources of each co-operating BTS. One or more Mobile Switching Centers (MSCs) may be connected to the IP-based CDMA 2000 cellular packet data telecommunications network for the provision of cellular service to subscribers, while a Packet Data Service Node (PDSN) performs the switching and routing functions directed to the packet data communications within the CDMA 2000 cellular telecommunications network.

The CDMA 2000 packet-data cellular telecommunications network provides Mobile IP service to packet mobile users. Mobile IP service is provided over a Point-to-Point Protocol (PPP) connection between the MN and the PDSN. When a PPP connection is established, negotiation messages are exchanged between the MN and the PDSN with regards to authentication and compression, followed by the MN's mobile IP registration. Thereafter, data may be sent from and to the MN, such as for example during a voice conversation or a file download. However, the MN becomes dormant when no data is transmitted for a certain period of time over the PPP connection. In instances when the MN is dormant, there is no traffic channel assigned to the mobile, although the PPP connection is maintained in both the MN and the PDSN.

When a mobile node moves within the packet data service area, instances arise when the MN is moved, or handed-off, from a first serving packet zone to a second service packet zone. This scenario involves the establishment of a new traffic channel between the new serving Base Station Controller (BSC) and the MN, as well as the establishment of a new PPP connection between the new serving PDSN and the MN.

Reference is now made to FIG. 1, wherein there is shown a nodal operation and signal flow diagram illustrating the complex and complicated prior art method for performing a dormant hand-off for a mobile node. Shown in FIG. 1 is a CDMA 2000 packet data cellular telecommunications network 100 comprising at least one Mobile Node (MN) 110, communicating over an air (radio) interface 112, and via a plurality of Base Transceiver Stations (BTSs, not shown) with a plurality of Base Station Controllers (BSCs), such as for example BSCs 114 and 116. The BSCs 14 and 116 may each comprise a Packet Control Function (PCF), which purpose is to manage the radio resources of each served BTS. Thus, the combined functionality of a BSC and a PCF is herein designated as BSC/PCF, although in some implementations the BSC and PCF may not be collocated. The network 100 may further comprise at least one Mobile Switching Center (MSC) 118 and a plurality of Packet Data Service Nodes (PDSNs), such as for example PDSN 120 and PDSN 122. The BSC/PCFs and the PDSNs may be connected with each other through an IP-based network 111. For the purpose of better understanding the present invention, it is assumed that a dormant MN 110 moves from a first packet zone, wherein it was served by BSC/PCF Source (BSC/PCF-S) 114 and PDSN Source (PDSN-S) 120, to a second packet zone wherein it is to be served by BSC/PCF Target (BSS/PCF-T) 116 and PDSN Target (PDSN-T) 122. By dormant MN, it is meant an MN that previously established a Point-to-Point Protocol (PPP) connection with a PDSN, such as for example with the PDSN-S 120, but that did not exchange data over that connection for a given period of time, thus causing the traffic channel between itself and the PDSN 120 to be dropped, while the PPP connection was kept active in both the MN and the PDSN-S.

Therefore, when the MN 110 crosses the packet zone boundary at dormant state, the MN 110 sends an origination request message 124 to the target BSC 116 via a BTS (not shown), for requesting service from BSC/PCF-T 116. Responsive to the receipt of the origination request message 124, the BSC/PCF-T 116 replies back to the MN 110 through a BS acknowledgement order message 129, for confirming that it accepts to serve the MN 110. The BSC 116 further exchanges with the serving MSC 118 serving set up messages 128 and 130, through which the MSC 118 is requested, and accepts, to support cellular service for the MN 110. Since the MN 110 has moved to a new packet zone, the target BSC 116 selects a new PDSN, such as the target PDSN 122 for providing mobile IP service for the MN 110, and thus sends an A11 registration request message 132 to the target PDSN 122 for requesting the set up of an A10 connection (also called herein a Radio network Packet data serving node session or connection, (RP) with the MN 110. Responsive to the receipt of the A11 registration request message 132, the target PDSN 122 replies back to the BSC/PCF-T 116 with an A11 registration reply message 136. The BSC/PCF-T 116 then sends to the MSC 118 an Assignment Failure message 137 informing the MSC that the MN 110 is dormant. At this stage, the PDSN-T 122 may begin to send data packets for the MN 110, action 139. In the prior art technique, the BSC/PCF-T 116 further signals the MSC 118 with a BS Service Request 141 for requesting packet data service, to which the MSC 118 responds with a BS service response 143 accepting the provision of packet data service. The MSC 118 further sends a Paging Request 145 to the BSC/PCF-T 116 to establish a, mobile terminated packet data call. Responsive to 145, the BSC/PCF-T 116 further issues a Page Message 149 over the paging channel, and receives back from the MN 110 a Page Response Message 151 over the access channel. Upon receipt of message 151, the BSC/PCF-T 116 places the Page Reponses Message in a Complete L3 Info Message 153 and sends it to the MSC 118. The BSC/PCF-T 116 also acknowledges to the MN 110 the receipt of the Page Response Message 151, in message 155. Responsive to the receipt of the message 153, the MSC finally requests the establishment of a traffic channel with the MN 110, action 157. With reference being now made jointly to FIG. 1.*a* and FIG. 1.*b*, channel establishment procedures take place in 159 resulting in a traffic channel 161 to be established between the MN 110 and the BSC/PCF-T 116. The data packets received from the PDSN-T 122 in 139, and that were buffered by the BSC/PCF-T 116, may now be sent to the MN 110, action 163, for the establishment of the new PPP connection 150 through PPP connection establishment procedure 148.

As it may be seeing, the prior art method for performing a dormant hand-off in a CDMA 2000 packet-data cellular telecommunications network is complicated and comprises unnecessary signalling that overuses the network's communications resources. For example, having a paging procedure involving at least messages 145, 149, 151, and 153 in order to locate yet again an MN that just registered with the BSC/PCF-T 116 is unnecessary.

It would be advantageous to have simpler method for performing a dormant hand-off in the CDMA 200 packet-data cellular telecommunications network, that takes advantage of the information already passed among the network's nodes for avoiding signalling associated with the transmission of redundant and unnecessary information.

The present invention provides such a solution.

SUMMARY OF THE INVENTION

It is therefore an object of the present invention to provide In an IP-based Code Division Multiple Access (CDMA) cellular telecommunications network, a method for handing-off a dormant Mobile Node (MN) to a target packet zone having a Packet Data Service Node (PDSN) and a Base Station Controller with a Packet Control Function (BSC/PCF), the method comprising the steps of:

transmitting from the dormant MN to the BSC/PCF an origination request message comprising an indication that the MN is dormant;

responsive to a receipt of the origination request, sending from the BSC/PCF to the PDSN a registration request message, the registration request comprising an indication of an identity of the MN and an indication that the MN is dormant;

transmitting from the PDSN to the BSC/PCF a registration reply for requesting an establishment of a traffic channel between the BSC/PCF and the MN, the registration reply comprising an indication that the PDSN has packet data ready to be sent to the MN;

responsive to a receipt of the registration reply by the BSC/PCF, establishing a traffic channel between the BSC/PCF and the MN.

It is another object of the present invention to provide an IP-based Code Division Multiple Access (CDMA) cellular telecommunications system comprising:

a target packet zone to which a dormant Mobile Node (MN) is being handed-off from a source packet zone, the target packet zone comprising:

a Base Station Controller having a Packet Control Function (BSC/PCF), the BSC/PCF receiving an origination request message from the dormant MN during the hand-off; and a Packet Data Service Node (PDSN) receiving from the BSC/PCF a registration request for requesting packet data service provision, the registration request comprising an identification of the MN and an indication that the MN is dormant;

wherein responsive to the receipt of the registration request message, the PDSN sends a registration reply message to the BSC/PCF for requesting an establishment of a traffic channel between the BSC/PCF and the MN.

BRIEF DESCRIPTION OF THE DRAWINGS

For a more detailed understanding of the invention, for further objects and advantages thereof, reference can now be made to the following description, taken in conjunction with the accompanying drawings, in which:

FIG. 1.*a* is a first part of a nodal operation and signal flow diagram illustrating a complex prior art method for performing a dormant hand-off for a mobile node;

FIG. 1.*b* is a second part of the nodal operation and signal flow diagram illustrating a complex prior art method for performing a dormant hand-off for a mobile node.

DETAILED DESCRIPTION OF THE PREFERRED EMBODIMENTS

Figure 2:
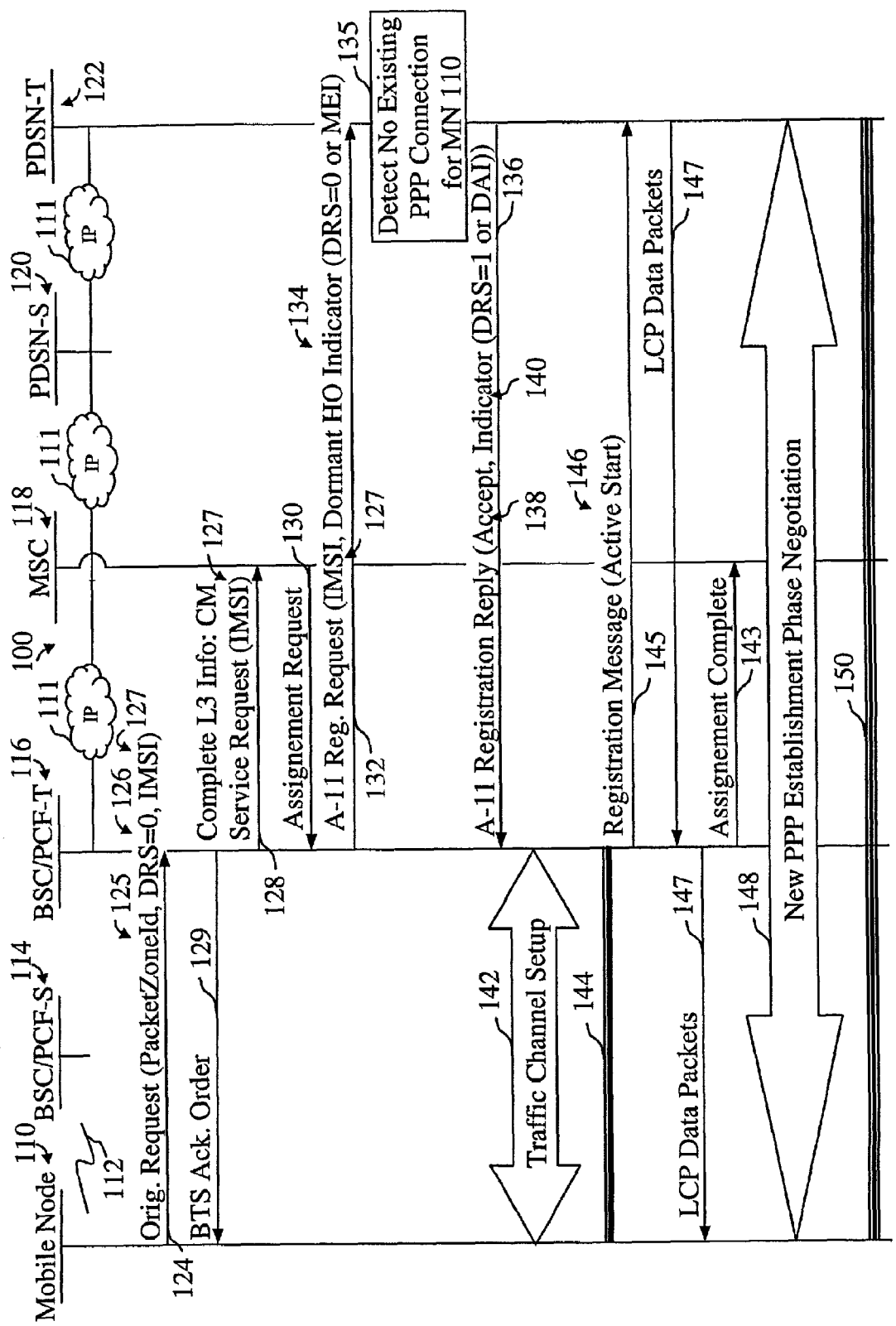
FIG. 2 is a nodal operation and signal flow diagram illustrative of the exemplary preferred embodiment of the invention.

Reference is now made to FIG. 2, wherein there is shown a nodal operation and signal flow diagram illustrative of an exemplary preferred embodiment of the invention. Shown in FIG. 2 is a CDMA 2000 packet data cellular telecommunications network 100 comprising at least one Mobile Node (MN) 110, communicating over an air (radio) interface 112, and via a plurality of Base Transceiver Stations (BTSs, not shown) with a plurality of Base Station Controllers (BSCs), such as for example BSCs 114 and 116. The BSCs 14 and 116 may each comprise a Packet Control Function (PCF), which purpose is to manage the radio resources of each BTS. The network 100 may further comprise at least one Mobile Switching Center (MSC) 118 and a plurality of Packet Data Service Nodes (PDSNs), such as for example PDSN 120 and PDSN 122. The BSC/PCFs and the PDSNs are connected with each other through an IP-based network 111. For the purpose of better understanding the present invention, it is assumed that a dormant MN 110 moves from a first packet zone, wherein it was served by BSC/PCF Source (BSC/PCF-S) 114 and PDSN Source (PDSN-S) 120, to a second packet zone wherein it is to be served by BSS/PCF Target (BSS/POF-T) 116 and PDSN Target (PDSN-T) 122. By dormant MN, it is meant an MN that previously established a Point-to-Point Protocol with a PDSN, such as for example with the PDSN-S 120, but that did not exchange data over that connection for a given period of time, thus causing the traffic channel between itself and the PDSN 120 to be dropped, while the PPP connection was kept active in both the MN and the PDSN-S 120.

Therefore, when the MN 110 crosses the packet zone boundary at dormant state, according to the preferred embodiment of the present invention, the MN 110 detects a new packet zone identification and sends an origination request message 124 to the target BSC 116 via a BTS, for requesting service from BSC/PCF-T 116 of the target packet system. According to the invention, the origination request message 124 may comprise a Packet Zone Identification parameter 125 indicative of the new packet zone the MN 110 is trying to register with, an indication 126 to the effect of that the MN 110 is dormant (no current data transfer is taking place), and an identification 127 of the MN 110 itself, preferably under the form of an International Mobile Station Identification (IMSI). The indication 126 may comprise the parameter Data Ready to Sent (DRS) set to zero (0), DRS=0, that indicates to the network that the MN 110 is dormant since it sent no data for a given period of time. Responsive to the receipt of the origination request message 124, the BSC/PCF-T 116 replies back to the MN 110 through a BS acknowledgement order message 129 for confirming the receipt of message 124. The BSC/PCF-T 116 may further exchange with the serving MSC 118 serving set up messages 128 and 130, through which the MSC 118 requests support of radio resources for the MN 110. In the present scenario, since the MN 110 has moved to a new packet zone, the BSC/PCF-T 116 selects a new PDSN, such as the target PDSN (PDSN-T) 122 for providing mobile IP service for the MN 110, and thus sends an A11 registration request message 132 to the PDSN-T 122 for requesting the set up of an A10 connection (also called herein a Radio network Packet data serving node session or connection, (RP) with the MN 110. According to the preferred embodiment of the present invention, the A11 registration request message 132 comprises first an identification of the MN 110, such as for example the IMSI 127, and an indication parameter 134 informing the target PDSN 122 that a dormant hand-off is being performed for the MN 110. The indication parameter 134 may comprise a Data Ready to Sent (DRS) parameter set to zero (0), DRS=0, for providing that information, or alternatively any other Mobility Event Indicator (MEI). Responsive to the receipt of the A11 registration request message 132, and based on the MN's IMSI 70, the PDSN-T 122 realises that it has no bindings for the MN 110 (no information characterizing a PPP connection is found in the PDSN for that MN), and thus deduct that it supports no current PPP connection for the MN 110, action 135, and replies back to the BSC/PCF-T 116 with an A11 registration reply message 136 requesting the establishment of a traffic channel. According to the preferred embodiment of the invention, the A11 registration reply message 136 may comprise an acceptance parameter 138 informing the target BSC 116 that the target PDSN 122 is to provide mobile IP service for the MN 110, and an indication 140 that the PDSN-T 122 has data ready to be sent to the MN 110. The indication 140 may comprise a PDSN_DRS parameter 140, that according to the preferred embodiment of the invention is now set to 1 (PDSN_DRS=1) for requesting the BSC/PCF 116 to set up the traffic channel and to inform BSC/PCF 116 that the PDSN 122 has data ready to be sent for the MN 110. Alternatively, the indication 140 may be any Data Available Indicator (DEI), as believed appropriate by the requirements or preferences of any network operator. According to the invention, upon receipt of the A11 registration reply message 136 having the indicator 140, the BSC/PCF-T 116 proceeds with the establishment of a traffic channel with the MN 110, action 142. The set-up of the traffic channel may be performed according to the standard IOS, Interoperability Standard for the Access network V.4.0 (or later) Verification and Validation (V&V), herein included by reference and referred to as the Standard.

One the traffic channel 144 is established, the BSC/PCF 116 reports to the PDSN-T 122 the successful establishment of the traffic channel through a Registration message 145 that may comprise an Active Start parameter 146.

Thereafter, the BSC/PCF-T 116 replies back to the MSC 118 with an assignment complete message 143 for confirming the establishment of the traffic channel 144.

Immediately following the receipt of the Registration message 145, the PDSN-T 122 may begin sending data packets intended for the MN 110. For example, the first data packets sent from the PDSN 122 to the MN 110 may comprise Link Layer Protocol (LCP) packets 147 that are used by the BSC/PCF-T 116 and the MN 110 to establish the new PPP session between the serving PDSN 122 and the MN 110.

The method continues with signalling messages being exchanged between the PDSN-T 122 and the MN 110 for the establishment of the PPP connection, action 148, as described for example in the Standard. Once the new PPP connection 150 is successfully established between the PDSN 122 and the MN 110, traffic data packets, such as for voice and data communications, may be exchanged between the PDSN-T 122 and the MN 110.

The present invention provides an significant simplification of the prior art method for dormant handoff by eliminating the need for paging-associated signalling when a dormant MN enters a new packet zone.

Although several preferred embodiments of the method and system of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. In an IP-based Code Division Multiple Access (CDMA) cellular telecommunications network, a method for handing-off a dormant Mobile Node (MN) to a target packet zone having a Packet Data Service Node (PDSN) and a Base Station Controller with a Packet Control Function (BSC/PCF), the method comprising the steps of:
   transmitting from the dormant MN to the BSC/PCF an origination request message comprising an indication that the MN is dormant;
   responsive to a receipt of the origination request, sending from the BSC/PCF to the PDSN a registration request message, the registration request comprising an indication of an identity of the MN and an indication that the MN is dormant;
   transmitting from the PDSN to the BSC/PCF a registration reply, the registration reply comprising an indication for requesting the BSC/PCF to set up a traffic channel between the BSC/PCF and the MN and for informing the BSC/PCF that the PDSN has packet data ready to be sent to the MN;
   responsive to a receipt of the registration reply by the BSC/PCF, establishing a traffic channel between the BSC/PCF and the MN.

2. The method claimed in claim 1, wherein the step of establishing a traffic channel between the BSC/PCF and the MN is performed responsive to a detection of the indication that the PDSN has packet data ready to be sent to the MN.

3. The method claimed in claim 2, wherein the indication that the PDSN has packet data ready to be sent to the MN is one of a Data Ready to Sent (DRS) parameter set to a value of 1, and a Data Available Indicator.

4. The method claimed in claim 1 further comprising the step of:
   establishing a Point-to-Point Protocol (PPP) connection between the PDSN and the MN.

5. The method claimed in claim 1, further comprising after the step of sending from the BSC/PCF to the PDSN a registration request message, and prior to the step of transmitting from the PDSN to the BSC/PCF a registration reply, the step of:
   upon receipt of the registration request message, detecting that there is no Point-to-Point (PPP) connection set up between the PDSN and the MN.

6. The method claimed in claim 1, further comprising following the establishment of the traffic channel, the step of reporting to a Mobile Switching Center (MSC) the establishment of the traffic channel.

7. The method claimed in claim 1 further comprising, following the receipt of the Registration message by the PDSN, the step of:
   sending Link Control Protocol (LCP) data packets from the PDSN to the BSC/PCF for the negotiation of a PPP connection.

8. The method claimed in claim 7 further comprising following the step of sending the LCP data packets, the step of:
   sending the LCP data packets from the BSC/PCF to the MN.

9. The method claimed in claim 1, wherein:
   the origination request message comprises an indication that the MN is dormant and an indication of an identity of the MN;
   the registration request message is an A-11 registration request message and comprises the indication that the MN is dormant and the indication of the identity of the MN; and
   the registration reply message is an A-11 registration reply message and comprises an indication that the PDSN has data to be sent to the MN.

10. The method claimed in claim 9, wherein:
    the indication that the MN is dormant is a Data Ready to Send (DRS) parameter set to a value of 0 (DRS=0) and the indication of the identity of the MN is an International Mobile Station Identification Parameter (IMSI); and
    the indication that the PDSN has data to be sent to the MN is a Data Ready to Send (DRS) parameter set to a value of 1 (DRS=1).

11. The method claimed in claim 1 wherein the IP-based Code Division Multiple Access (CDMA) cellular telecommunications network is a CDMA 2000 cellular network.

12. An IP-based Code Division Multiple Access (CDMA) cellular telecommunications system comprising:
    a target packet zone to which a dormant Mobile Node (MN) is being handed-off from a source packet zone, the target packet zone comprising:
       a Base Station Controller having a Packet Control Function (BSC/PCF), the BSC/PCF receiving an origination request message from the dormant MN during the hand-off; and
       a Packet Data Service Node (PDSN) receiving from the BSC/PCF a registration request for requesting packet data service provision, the registration request comprising an identification of the MN and an indication that the MN is dormant;
    wherein responsive to the receipt of the registration request message, the PDSN sends a registration reply message to the BSC/PCF, the registration reply comprising an indication for requesting the BSC/PCF to set up a traffic channel between the BSC/PCF and the MN end for informing the BSC/PCF that the PDSN has packet data ready to be sent to the MN.

13. The IP-based CDMA cellular telecommunications system claimed in claim 12, wherein responsive to the receipt of the registration reply message, the BSC/PCF establishes a traffic channel with the MN.

14. The IP-based CDMA cellular telecommunications system claimed in claim 13, wherein following the establishment of the traffic channel, the BSC/PCF sends a Registration message to the PDSN for reporting the successful establishment of the traffic channel.

15. The IP-based CDMA cellular telecommunications system claimed in claim 14, wherein following the receipt of the Registration message, the PDSN sends to the BSC/PCF Link Control Protocol (LCP) data packets for the negotiation of a PPP connection.

16. The IP-based CDMA cellular telecommunications system claimed in claim 15, wherein the BSC/PCF sends the LCP data packets to the MN.

17. The IP-based CDMA cellular telecommunications system claimed in claim 12, wherein:
    the origination request message comprises an indication that the MN is dormant and an indication of an identity of the MN; and
    the registration request message is an A-11 registration request message and comprises the indication that the MN is dormant and the indication of the identity of the MN.

18. The IP-based CDMA cellular telecommunications system claimed in claim 17, wherein:
    the indication that the MN is dormant is a Data Ready to Send (DRS) parameter set to a value of 0 (DRS=0) and the indication of the identity of the MN is an International Mobile Station Identification Parameter (IMSI); and
    the indication that the PDSN has data to be sent to the MN is one of a Data Ready to Send (DRS) parameter set to a value of 1 (DRS=1), and a Data Available Indicator.

19. The IP-based CDMA cellular telecommunications system claimed in claim 12, wherein the IP-based Code Division Multiple Access (CDMA) cellular telecommunications system is a CDMA 2000 cellular network.

* * * * *